US009725189B2

(12) United States Patent
Umlauft et al.

(10) Patent No.: US 9,725,189 B2
(45) Date of Patent: Aug. 8, 2017

(54) INTERIOR COMPONENT CARRIER SYSTEM, AIRCRAFT INTERIOR COMPONENT MODULE AND ASSEMBLY METHOD

(71) Applicant: AIRBUS OPERATIONS GMBH, Hamburg (DE)

(72) Inventors: Sebastian Umlauft, Hamburg (DE); Dirk Humfeldt, Hamburg (DE); Thomas Helck, Hamburg (DE); Mathias Schwenger, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 783 days.

(21) Appl. No.: 13/735,566

(22) Filed: Jan. 7, 2013

(65) Prior Publication Data
US 2013/0200213 A1   Aug. 8, 2013

Related U.S. Application Data

(63) Continuation of application No. PCT/EP2011/003335, filed on Jul. 5, 2011.
(Continued)

(30) Foreign Application Priority Data
Jul. 9, 2010   (DE) .......................... 10 2010 026 683

(51) Int. Cl.
*B64D 11/00* (2006.01)
*B64D 47/00* (2006.01)
(Continued)

(52) U.S. Cl.
CPC .............. *B64D 47/00* (2013.01); *B64C 1/066* (2013.01); *B64D 11/003* (2013.01); *B64F 5/10* (2017.01);
(Continued)

(58) Field of Classification Search
CPC . B64D 11/003; B64D 2011/0046; B64C 1/06; B64C 1/066; B64F 5/0009
See application file for complete search history.

(56) References Cited

U.S. PATENT DOCUMENTS

| 4,490,883 A * | 1/1985 | Gauron | B64C 1/066 16/245 |
|---|---|---|---|
| 4,739,955 A * | 4/1988 | Aquino | B64C 1/403 160/88 |

(Continued)

FOREIGN PATENT DOCUMENTS

| DE | 39 04 375 | 8/1990 |
|---|---|---|
| DE | 10 2005 054 890 | 5/2007 |

(Continued)

*Primary Examiner* — Tien Dinh
*Assistant Examiner* — Michael A Fabula
(74) *Attorney, Agent, or Firm* — Dickinson Wright

(57) ABSTRACT

An interior component carrier system for use in assembly of aircraft interior components in an aircraft includes a retaining system with at least one retaining element. A first connection device for connecting the retaining element to a first aircraft interior component and a second connection device are provided on the retaining element. On the retaining element a structural retainer is provided for fastening the retaining element to an aircraft structure. The interior component carrier system includes a hinge connectable to a second and a third aircraft interior component such that the third aircraft interior component is pivotable about a longitudinal axis of the hinge relative to the second aircraft interior component. The second connection device mounted on the retaining element is configured to be connected to the hinge and/or to a region of the second or third aircraft interior component, that is adjacent to the hinge.

20 Claims, 6 Drawing Sheets

Related U.S. Application Data

(60) Provisional application No. 61/362,963, filed on Jul. 9, 2010.

(51) Int. Cl.
  *B64C 1/06* (2006.01)
  *B64F 5/10* (2017.01)

(52) U.S. Cl.
  CPC . *B64D 2011/0046* (2013.01); *Y10T 29/49826* (2015.01); *Y10T 29/53961* (2015.01)

(56) References Cited

U.S. PATENT DOCUMENTS

| | | | | |
|---|---|---|---|---|
| 4,799,631 | A * | 1/1989 | Humphries | B64D 11/00 105/337 |
| 5,201,831 | A * | 4/1993 | Higgins | B64C 1/066 244/118.5 |
| 5,549,258 | A | 8/1996 | Hart | |
| 6,318,671 | B1 | 11/2001 | Schumacher | |
| 2005/0236523 | A1 * | 10/2005 | Schwartz | B64C 1/066 244/119 |
| 2006/0237585 | A1 * | 10/2006 | Lau | B60Q 3/025 244/118.5 |
| 2008/0277527 | A1 | 11/2008 | Fokken | |
| 2009/0230244 | A1 * | 9/2009 | Kofinger | B64C 1/066 244/118.5 |
| 2009/0250554 | A1 * | 10/2009 | Graeber | B64C 1/06 244/120 |
| 2010/0301167 | A1 * | 12/2010 | Humfeldt | B64F 5/0009 244/131 |
| 2010/0301537 | A1 * | 12/2010 | Humfeldt | B64D 11/003 269/55 |
| 2010/0320318 | A1 * | 12/2010 | Roth | B64C 1/066 244/118.5 |
| 2011/0024565 | A1 * | 2/2011 | Koefinger | B64C 1/066 244/131 |
| 2011/0138603 | A1 * | 6/2011 | Blees | B64F 5/00 29/429 |
| 2011/0253836 | A1 * | 10/2011 | Hashberger | B64D 11/003 244/118.5 |
| 2012/0074258 | A1 * | 3/2012 | Papke | B64C 1/066 244/118.5 |
| 2012/0137487 | A1 | 6/2012 | Umlauft | |
| 2012/0145828 | A1 * | 6/2012 | Grosse-Plankermann | B64D 11/00 244/118.5 |

FOREIGN PATENT DOCUMENTS

| | | |
|---|---|---|
| DE | 10 2009 023 391 | 12/2010 |
| DE | 10 2009 023 393 | 12/2010 |
| DE | 10 2009 023 400 | 12/2010 |
| DE | 10 2009 023 401 | 12/2010 |
| EP | 0 983 938 | 3/2000 |

* cited by examiner

INTERIOR COMPONENT CARRIER SYSTEM, AIRCRAFT INTERIOR COMPONENT MODULE AND ASSEMBLY METHOD

CROSS REFERENCE TO RELATED APPLICATIONS

This application is entitled to and claims the benefit of German Application No. DE 10 2010 026 683.3 and U.S. Provisional Application No. 61/362,963, both filed Jul. 9, 2010, the disclosures of which, including the specification, drawings and abstract, are incorporated herein by reference in their entirety.

FIELD

The invention relates to an interior component carrier system that serves to connect a plurality of aircraft interior components to an aircraft interior component module and to fasten the aircraft interior component module to an aircraft structure. The invention further relates to an aircraft interior component module equipped with such an interior component carrier system as well as to a method of assembling such an aircraft interior component module in an aircraft.

BACKGROUND

When assembling interior components in an aircraft the conventional practice is currently to connect components, such as for example dado panels, side linings, ceiling linings, light strips, luggage compartments and the like, individually to the aircraft structure. As each component has to be separately positioned and fastened to the aircraft structure, assembling these components is very time-consuming. In a similar manner pipes, which are used for example as air-carrying lines of an aircraft air conditioning system or to supply water in an aircraft cabin, and electric lines are currently also fastened individually in a time-consuming manner to the aircraft structure. After assembly during a final inspection the correct functioning of all of the lines has to be checked. In particular, all of the pipes have to be tested for leaks, while in the case of the electric lines all of the interfaces have to be checked. These tests are likewise relatively laborious since the lines and interfaces to be inspected are frequently accessible only with difficulty in the assembled state of the lines.

For this reason efforts are being made to preassemble and test interior components provided for assembly in an aircraft, for example in an aircraft cabin, as comprehensively as possible outside of the aircraft. In particular modules, which may comprise at least one overhead luggage compartment, at least one side lining panel as well as further interior components, such as for example electric lines, pipes used as air-carrying lines of an aircraft air conditioning system or to supply water in the aircraft cabin, lighting elements, personal service units and personal service channels, are to be preassembled and tested outside of the aircraft optionally with the aid of an assembly frame described in DE 10 2009 023 391. The modules are then to be transported into a final assembly position in a fuselage element by means of a transport device described in DE 10 2009 023 393. In the fuselage element the modules are finally to be connected to the aircraft structure in as simple and time-saving a manner as possible. For this purpose the support systems described in DE 10 2009 023 400 and DE 10 2009 023 401 may be used.

SUMMARY

The invention is directed to the object of providing a lightweight interior component carrier system, by means of which a plurality of interior components provided for assembly in an aircraft may be connected in a simple, secure and time-saving manner to an aircraft interior component module and the aircraft interior component module may be fastened to an aircraft structure. The invention is further directed to the object of indicating an aircraft interior component module equipped with such an interior component carrier system as well as a method of assembling such an aircraft interior component module in an aircraft.

This object is achieved by an interior component carrier system having the features of attached claims, an aircraft interior component module having the features of attached claims, and a method of assembling an aircraft interior component module in an aircraft having the features of attached claims.

An interior component carrier system according to the invention that is suitable for use in the assembly of aircraft interior components in an aircraft comprises a retaining system with at least one retaining element. On the retaining element a first connection device is provided for connecting the retaining element to a first aircraft interior component. A second connection device is further provided on the retaining element. The first connection device may be positioned for example in the region of a first end of the retaining element. The second connection device on the other hand may be provided for example in the region of a second end of the retaining element that lies opposite the first end. Additionally on the retaining element a structural retainer is provided for fastening the retaining element to an aircraft structure. The structural retainer may be for example a structural retainer that is described in DE 10 2009 023 400. The interior component carrier system according to the invention further comprises a hinge that can be connected to a second and a third aircraft interior component. In particular the hinge is used to connect the second and the third aircraft interior component in such a way to one another that the third aircraft interior component is pivotable about a longitudinal axis of the hinge and relative to the second aircraft interior component. The second connection device mounted on the retaining element is configured to be connected to the hinge and/or to a region of the second and/or the third aircraft interior component that is adjacent to the hinge.

The retaining element of the interior component carrier system therefore establishes a connection of the first aircraft interior component to the second and the third aircraft interior component. The retaining element further serves to fasten the first aircraft interior component and hence also the second and third aircraft interior component to the aircraft structure. The retaining element therefore forms a central component of the interior component carrier system that performs the dual function of, on the one hand, connecting the aircraft interior components to one another and, on the other hand, providing for a fastening of the aircraft interior components to the aircraft structure. Thus, by means of the interior component carrier system according to the invention a plurality of aircraft interior components may be connected into an aircraft interior component module. The preassembly of the aircraft interior component module may be effected, if desired, conveniently outside of the aircraft. The interior component carrier system moreover enables a simple, secure and time-saving assembly of the preassembled aircraft interior component module in the aircraft. Thus, with the aid of the interior component carrier system according to the invention the interior component assembly in an aircraft may be made markedly simpler. A quality improvement is further enabled since for example tolerances of the individual interior components may already be compensated during preassembly of the module.

On the retaining element a third connection device for connecting the retaining element to a fourth aircraft interior component and/or a fourth connection device for connecting the retaining element to a fifth aircraft interior component may further be provided. The retaining element then makes it possible to dispense with additional components for connecting the fourth and/or the fifth aircraft interior component to the module that already comprises the first, the second and the third aircraft interior component. Final assembly of the interior components in the aircraft is therefore further simplified. The weight of the module is moreover minimized. It is self-evident that further interior components, which may also comprise electric lines or air-carrying lines, may be connected to the module comprising the first, the second and the third aircraft interior component. For this purpose the module may comprise further retaining or fastening systems.

The retaining system of the interior component carrier system according to the invention may comprise at least two retaining elements. The two retaining elements of the retaining system have preferably substantially the same basic shape. For example the two retaining elements may have a substantially elongate, but flat basic shape. To enable the retaining elements to perform their intended retaining and stabilizing function in an aircraft interior component module equipped with the interior component carrier system according to the invention, the retaining elements are preferably of an integral construction, i.e. without hinge points or the like. In principle the retaining elements may be made of various materials that are suitable for use in aircraft construction. For example the retaining elements may be manufactured from metal, preferably aluminium or an aluminium alloy. A particularly low weight combined with good mechanical properties is however possessed by retaining elements that are made of a fibre-reinforced plastic, for example a glass fibre or carbon fibre reinforced plastic.

When the retaining system is connected to the first aircraft interior component, the hinge, the second and/or the third aircraft interior component, the two retaining elements of the retaining system extend preferably substantially parallel to one another. At least one connection device provided on the first retaining element may be mounted on a first lateral surface of the first retaining element that, when the retaining system is connected to the first aircraft interior component, the hinge, the second and/or the third aircraft interior component, faces a first lateral surface of the second retaining element, on which lateral surface a corresponding connection device provided on the second retaining element is mounted. In other words, connection devices provided on the two retaining elements may be positioned opposite one another and may jointly form a connection system for the secure connection of an aircraft interior component to the retaining elements.

The first connection device may be for example a connection device for connecting the retaining element to an overhead luggage compartment. For example the first connection device may comprise a hole or a plurality of holes, which extends/extend through the retaining element and is/are used to receive a suitable fixing means, such as for example a screw or a rivet. The retaining element may then be fastened for example to a side wall of the overhead luggage compartment, in which case for example a portion of the first lateral surface of the retaining element, on which at least one further connection device is mounted, rests against an outer surface of the side wall of the overhead luggage compartment.

The second connection device may be a connection device for connecting the retaining element to a hinge that connects a cove light panel to a window panel, a region of the cove light panel that is adjacent to the hinge and/or a region of the window panel that is adjacent to the hinge. The second connection device may be for example of a substantially L-shaped configuration. A first limb of the L-shaped second connection device may then be fastened for example by screwing or riveting to the retaining element. A second limb may then extend for example at an angle of ca. 90° from the first limb and for example from the first lateral surface of the retaining element and be configured with holes for receiving fixing means in the form of screws, rivets or the like. The second connection device may also be provided with a suitable detent device, by means of which the second connection device may be connected by latching to the hinge and/or a region of the second and/or the third aircraft interior component that is adjacent to the hinge. The second connection device is however preferably provided for interacting with a hinge element of the hinge in order to establish a connection between the retaining element and the hinge.

The third connection device may be a connection device for connecting the retaining element to a lighting element. For example the third connection device may comprise a fastening plate that may preferably be screwed, riveted or connected in some other way to the retaining element in the region of the first lateral surface of the retaining element. From the fastening plate a substantially U-shaped assembly portion may extend, which is suitable for engaging around a for example elongate lighting element that has a substantially rectangular cross section.

The fourth connection device may be a connection device for connecting the retaining element to an air outlet element of an aircraft air conditioning system. For example the fourth connection device may comprise a fastening plate that may be fastened by screwing, riveting or the like to the retaining element. The fastening plate is preferably fastened to the first lateral surface of the retaining element. From the fastening plate a web may extend, wherein the angle between the fastening plate and the web may depend upon the desired position of the air outlet element and may be for example between 80° and 120°. There may be connected to the web an assembly portion, which is penetrated by holes for receiving fixing means in the form of screws, rivets or the like and hence allows a connection to be established between the fourth connection device and the air outlet element.

The hinge of the interior component carrier system is preferably constructed in the form of a film hinge, which comprises a hinge film extending along the longitudinal axis of the hinge. The hinge film may be made for example from a plastic, in particular a polyurethane material. The hinge film may however alternatively be made from another material that is suitable for use in aircraft construction. The hinge film may be of a transparent design or be designed in the colour of the aircraft interior components adjacent to the hinge film. The hinge film may extend over only a part of the longitudinal axis of the hinge and may optionally also be of a multipart construction. The hinge film however preferably extends over the entire longitudinal axis of the hinge and/or over the entire length of an assembly gap between the second and the third aircraft interior component. The hinge film is then not only capable of enabling a relative movement between the second and the third aircraft interior component but also covers the assembly gap between the second and the third aircraft interior component, i.e. prevents the penetration of dirt or moisture into the assembly gap.

Fixing lugs that extend over a part of the length or the entire length of the longitudinal axis of the hinge may be mounted on the hinge film. The fixing lugs may be constructed integrally with the hinge film and serve to fix the hinge film to the second and the third aircraft interior component. For example the fixing lugs may be glued to the second and the third aircraft interior component or connected in some other way to the second and the third aircraft interior component. The connection of the hinge film to the second and the third aircraft interior component is preferably effected in the region of a rear side of the second and the third aircraft interior component, i.e. in the region of a side of the second and the third aircraft interior component that is not visible when the second and the third aircraft interior component are installed in an aircraft.

Additionally or alternatively the hinge may comprise at least one hinge element. The hinge element may have a first fastening portion connectable to the second aircraft interior component and a second fastening portion connectable to the third aircraft interior component. A connection portion that is connectable to the second connection device of the retaining element and/or a retaining portion that is connectable to the hinge film of the hinge may further be provided. Preferably the hinge comprises two hinge elements, which may be positionable at two opposite ends of the hinge longitudinal axis. The hinge elements are then particularly suitable for connecting the hinge to two retaining elements, which extend substantially parallel to one another, of the retaining system of the interior component carrier system according to the invention.

The hinge may further comprise at least one stiffening element, which is connected to the hinge film, extends along at least a portion of the longitudinal axis of the hinge and is connectable to the second or the third aircraft interior component. Preferably the hinge comprises at least two stiffening elements that are fastenable on either side of the hinge film along the longitudinal axis of the hinge to the second and the third aircraft interior component respectively. The stiffening elements are preferably made from a glass fibre or a carbon fibre reinforced plastic. It is however alternatively conceivable to manufacture the stiffening elements from metal, for example from aluminium. This leads however to an increased weight of the hinge. It is self-evident that the hinge may also comprise a plurality of stiffening elements that may be arranged distributed along the longitudinal axis of the hinge.

An aircraft interior component module according to the invention comprises a previously described interior component carrier system. The module further comprises a first aircraft interior component, which is connected by means of the first connection device to at least one retaining element of the retaining system of the interior component carrier system. A second aircraft interior component is connected by the hinge of the interior component carrier system in such a way to a third aircraft interior component that the third aircraft interior component is pivotable about the longitudinal axis of the hinge relative to the second aircraft interior component. The second connection device provided on the retaining element of the retaining system of the interior component carrier system is connected to the hinge and/or to a region of the second and/or the third aircraft interior component that is adjacent to the hinge in order to fasten the second and the third aircraft interior component to the retaining element. The aircraft interior component module is fastenable to an aircraft structure by means of the structural retainer provided on the retaining element of the retaining system of the interior component carrier system. The aircraft interior component module according to the invention may be preassembled by means of the interior component carrier system, if desired, outside of the aircraft into an independently manipulable assembly group. The module may then be transported in its final assembly position and fastened to the aircraft structure by means of the structural retainer of the interior component carrier system. The aircraft interior component module according to the invention therefore makes it possible considerably to simplify the final assembly of interior components in an aircraft.

The aircraft interior component module may comprise a fourth aircraft interior component, which is connected by means of the third connection device to the retaining element of the retaining system of the interior component carrier system. The module may further comprise a fifth aircraft interior component, which is connected by means of the fourth connection device to the retaining element of the retaining system of the interior component carrier system.

A first retaining element of the retaining system may be fastened by means of the first connection device of the first retaining element to a first side wall of the first aircraft interior component. A second retaining element of the retaining system may be fastened by means of the first connection device of the second retaining element to a second side wall of the first aircraft interior component that lies opposite the first side wall. The first and the second retaining element of the retaining system preferably extend substantially parallel to one another in the state of connection to the first aircraft interior component. For example the retaining elements of the retaining system are fastened to outer surfaces of the mutually opposite side walls of the first aircraft interior component.

The second, the third, the fourth and/or the fifth aircraft interior component may be connected to the first retaining element by means of a connection device of the first retaining element that is mounted on a first lateral surface of the first retaining element. The second, the third, the fourth and/or the fifth aircraft interior component may further be connected to the second retaining element by means of a connection device of the second retaining element that is mounted on a first lateral surface of the second retaining element, wherein the first lateral surface of the first retaining element faces the first lateral surface of the second retaining element. In other words, the connection devices provided on the first and the second retaining element and provided for connection to an aircraft interior component are preferably mounted on mutually opposite first lateral surfaces of the first and the second retaining element.

In the aircraft interior component module according to the invention the first aircraft interior component may be an overhead luggage compartment. The second aircraft interior component may be a cove light panel. The third aircraft interior component may be a window panel. The window panel is preferably constructed integrally with a dado panel, wherein a decompression device may be integrated into the dado panel. The fourth aircraft interior component may be for example a lighting element. The fifth aircraft interior component may be for example an air outlet element of an aircraft air conditioning system.

In the aircraft interior component module according to the invention the hinge film of the hinge, configured in the form of a film hinge, of the interior component carrier system may extend along an assembly gap between the first and the third aircraft interior component. The hinge film preferably substantially completely covers the assembly gap. At least one hinge element of the hinge may be connected by means of the first fastening portion of the hinge element to the second aircraft interior component and by means of the second fastening portion of the hinge element to the third aircraft interior component. Furthermore, at least one stiffening element of the hinge that is connected to the hinge film may be connected along at least a portion of the longitudinal axis of the hinge to the second or the third aircraft interior component. If desired or necessary, a first stiffening element may be connected to the second aircraft interior component and a second stiffening element may be connected to the third aircraft interior component.

On the third aircraft interior component a further structural retainer may be provided for connecting the third aircraft interior component to the aircraft structure. If the third aircraft interior component is configured in the form of a window panel constructed integrally with a dado panel, the further structural retainer is fastened preferably in the region of the dado panel to the third aircraft interior component. For example the further structural retainer may be fastened to the third aircraft interior component in the region of a rear side of the dado panel that is not visible in the state of assembly of the aircraft interior component module in an aircraft. The aircraft interior component module according to the invention may consequently be secured to the aircraft structure with the aid of the structural retainer of the interior component carrier system. Then by means of the further structural retainer the third aircraft interior component may be secured in its position in particular relative to the second aircraft interior component. The aircraft interior component module according to the invention may therefore be fastened to the aircraft structure with the aid of a very low number of assembly points that are to be provided on the aircraft structure.

In a method according to the invention of assembling an aircraft interior component module in an aircraft, first a previously described aircraft interior component module is preassembled outside of the aircraft. Then the aircraft interior component module is transported into a final assembly position in a fuselage element. For this purpose for example a transport device described in DE 10 2009 023 393 may be used. The fuselage element may be a fuselage shell that is for example open at at least one end. However the aircraft interior component module may alternatively be introduced into an almost completely or completely constructed fuselage. All that matters is that the fuselage element has an entrance that allows the module to be introduced into its final assembly position in the fuselage element. Finally the aircraft interior component module is fastened to an aircraft structure by means of the structural retainer of the interior component carrier system.

During preassembly, interim storage and/or transport the third aircraft interior component of the module may be pivoted by means of the hinge relative to the second aircraft interior component into a position differing from the final assembly position of the two interior components. In particular the second and the third aircraft interior component during preassembly, interim storage and/or transport of the module may be pivoted in such a way relative to one another that the total volume of the module is reduced. This makes it possible for example for the preassembled module to be stored temporarily in a space-saving manner and/or transported into its final assembly position in the fuselage element through a comparatively small access opening in the fuselage element. The assembly method according to the invention then comprises preferably the pivoting of the third aircraft interior component relative to the second aircraft interior component by means of the hinge into its final assembly position, in which the third aircraft interior component may be fastened, for example by means of the further structural retainer, in a desired position to the aircraft structure.

BRIEF DESCRIPTION OF THE DRAWINGS

There now follows a detailed description of a preferred embodiment of the invention with reference to the accompanying diagrammatic drawings, wherein.

DETAILED DESCRIPTION OF EMBODIMENTS

Figure 1:
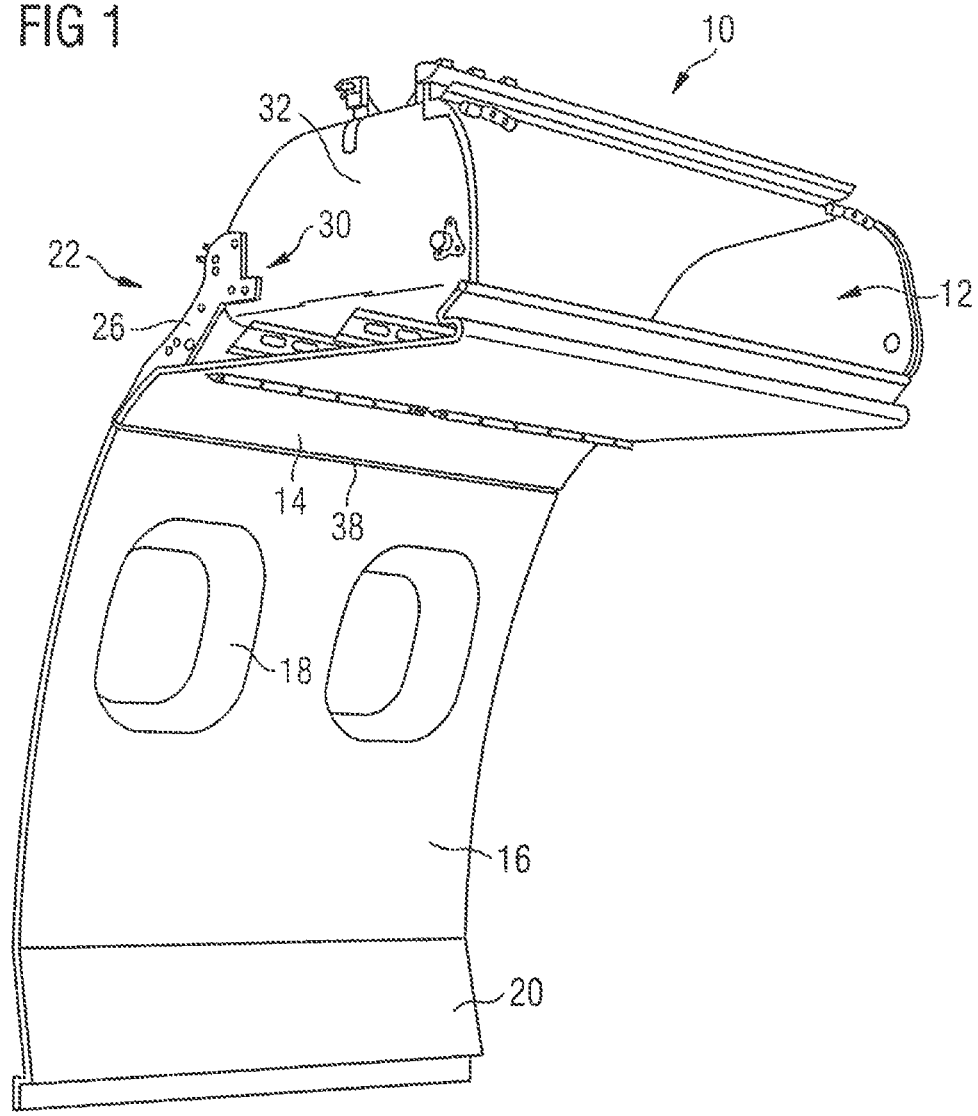
FIG. 1 shows a three-dimensional view of an aircraft interior component module.
Figure 2:
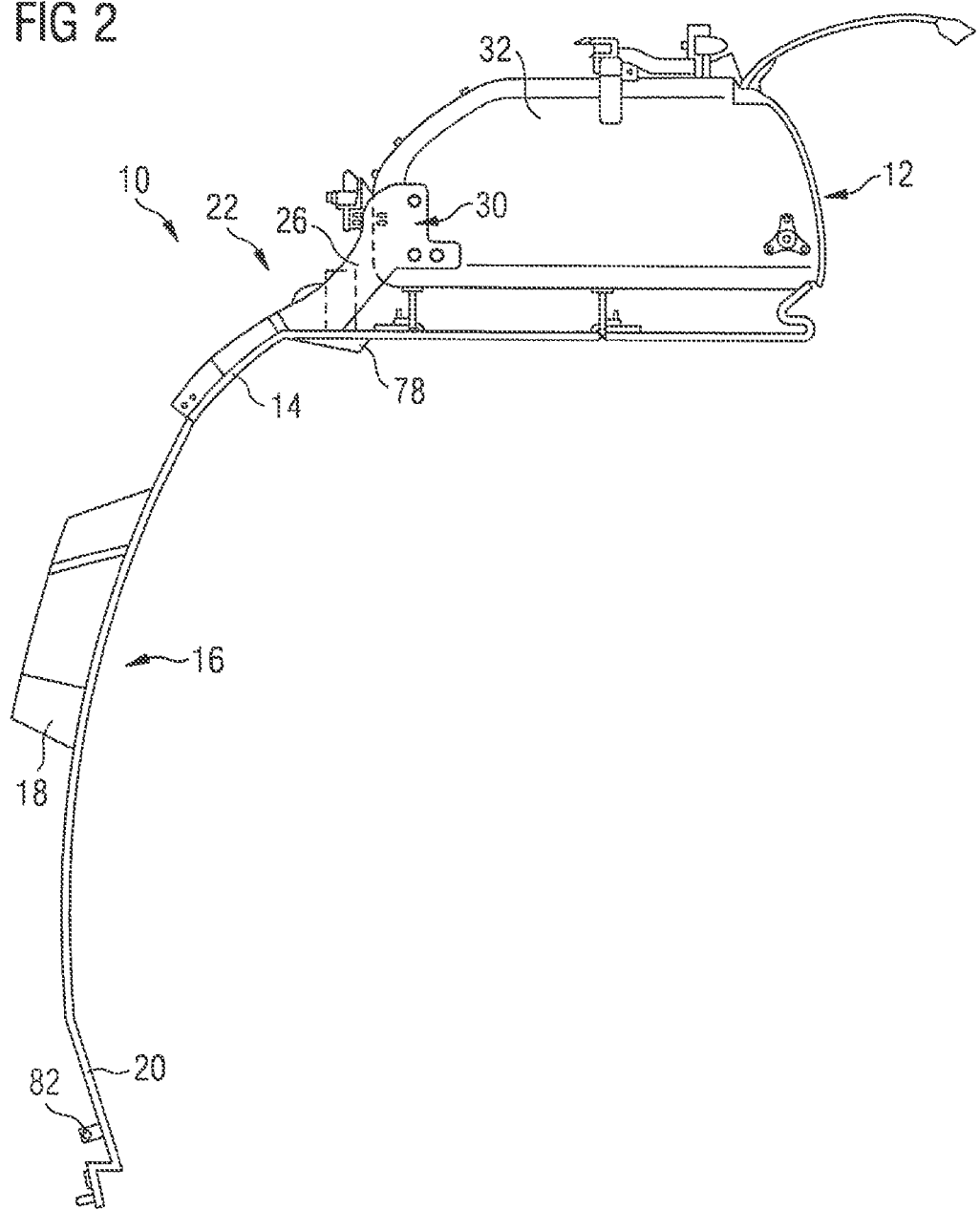
FIG. 2 shows a side view of the aircraft interior component module according to FIG. 1.
Figure 5:
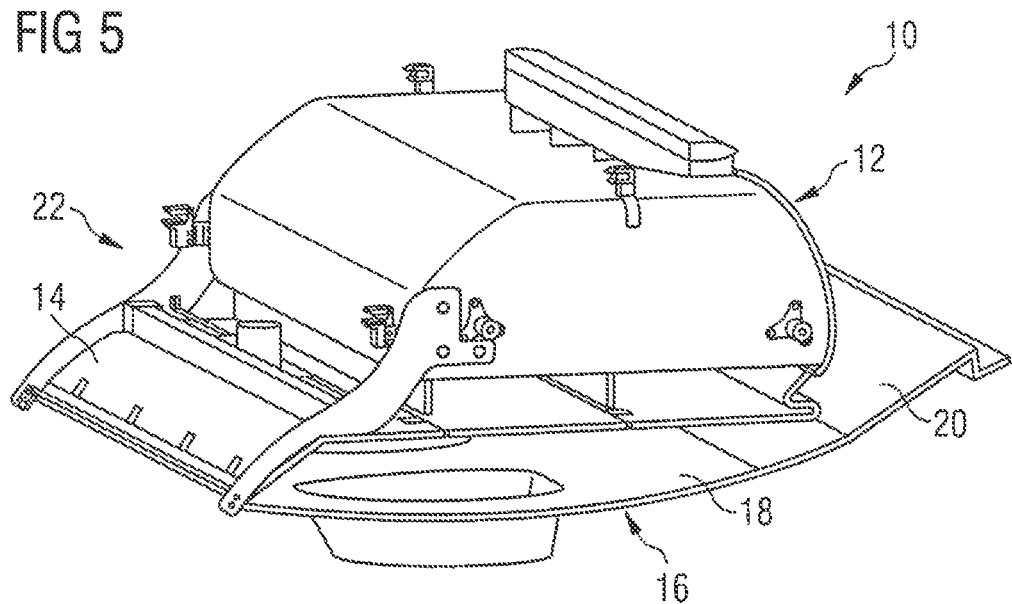
FIG. 5 shows a three-dimensional view of the aircraft interior component module according to FIG. 1, wherein a third aircraft interior component is pivoted relative to a second aircraft interior component of the module.

An aircraft interior component module 10 that is represented in FIGS. 1, 2 and 5 comprises a first aircraft interior component 12 configured in the form of an overhead luggage compartment as well as a second aircraft interior component 14 configured in the form of a cove light panel. As a third aircraft interior component 16 the module 10 comprises a window panel 18 that is constructed integrally with a dado panel 20. A decompression device that is not represented in detail in the figures is integrated into the dado panel 20.

Figure 3:
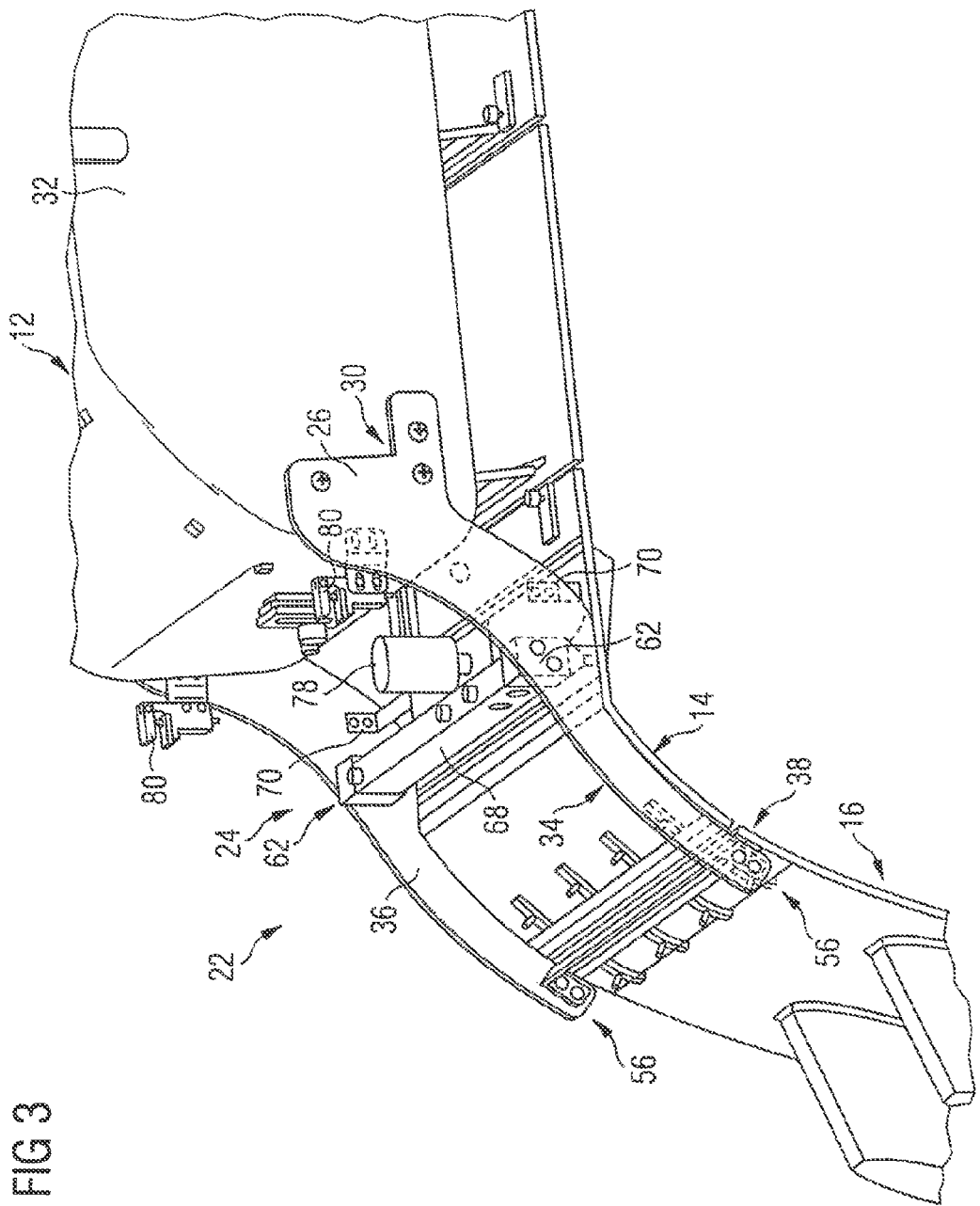
FIG. 3 shows a three-dimensional detail view of an interior component carrier system of the aircraft interior component module according to FIG. 1.
Figure 4:
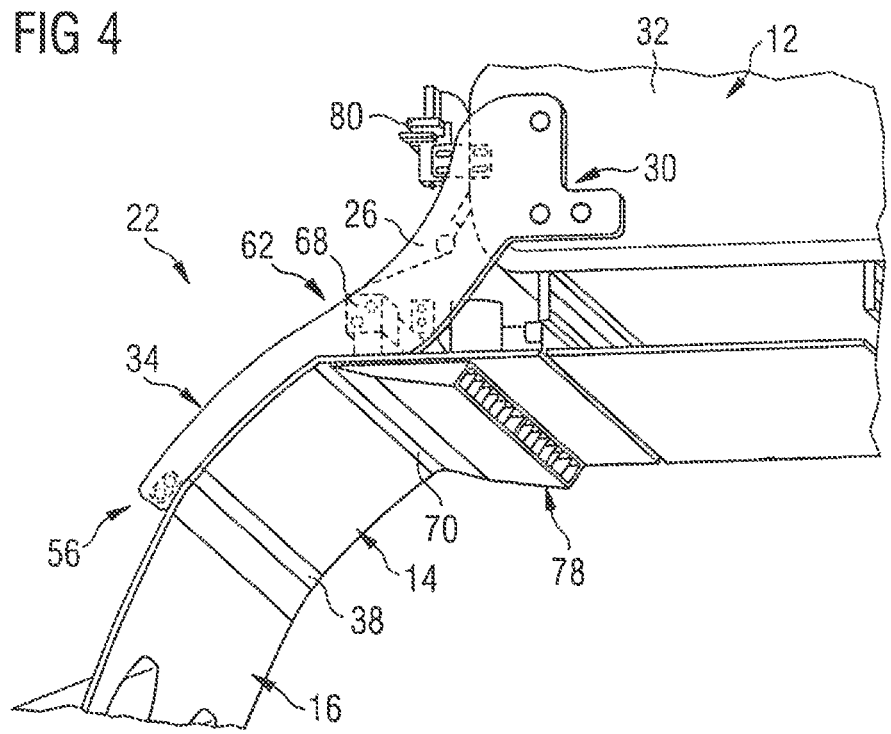
FIG. 4 shows a further three-dimensional view of the interior component carrier system according to FIG. 3.
Figure 6:
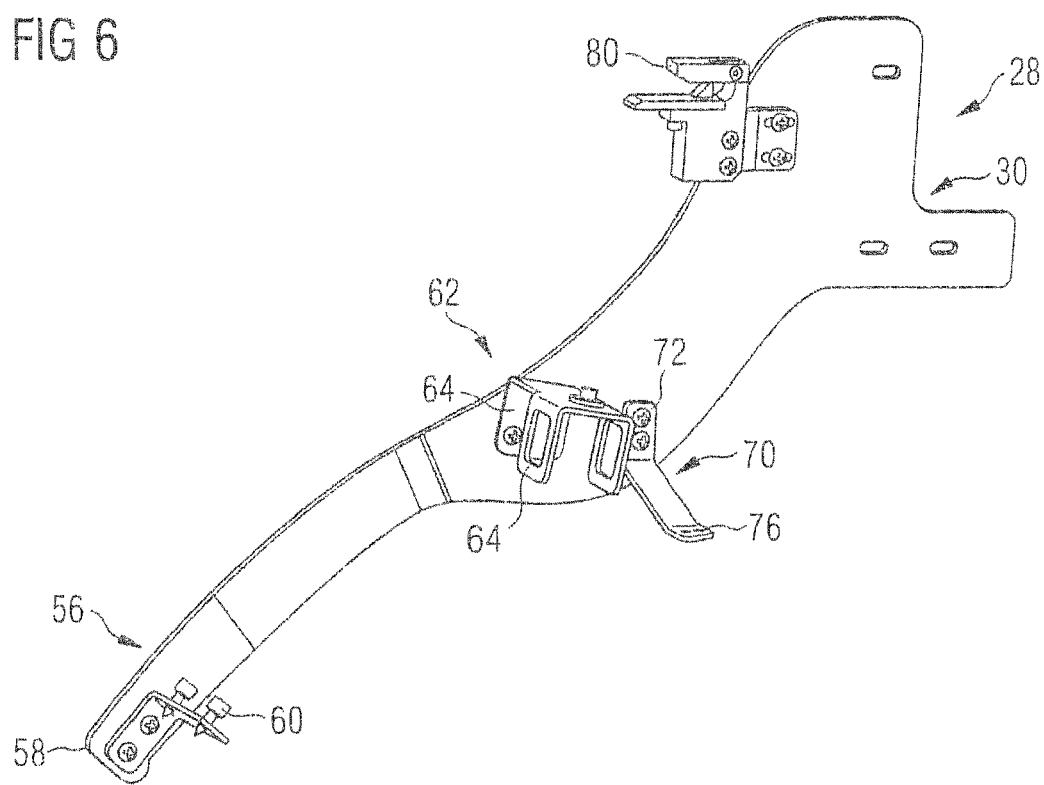
FIG. 6 shows a retaining element of a retaining system of the interior component carrier system according to FIGS. 3 and 4.

An interior component carrier system 22 of the aircraft interior component module 100 that is represented in particular in FIGS. 3 and 4 comprises a retaining system 24, which has two retaining elements 26, 28 represented in detail in FIG. 6. In the region of a first end the first retaining element 26 of the retaining system 24 is provided with a first connection device 30. The first connection device 30 comprises three holes, which penetrate the first retaining element 26 and through which screws, rivets or other suitable fixing means may be passed in order to fix the first retaining element 26 to an outer surface of a side wall 32 of the first aircraft interior component 12 constructed in the form of an overhead luggage compartment.

In a similar fashion the second retaining element 28 in the region of a first end is provided with a first connection device, which comprises three holes penetrating the second retaining element 28 as well as screws, rivets or other suitable fixing means received in the holes and is used to fix the second retaining element 28 to an outer surface of a side wall of the first aircraft interior component 12 that lies opposite the side wall 32 of the first aircraft interior component 12 configured in the form of an overhead luggage compartment. In the state of connection to the first aircraft interior component 12 the retaining elements 26, 28 of the retaining system 24 therefore extend substantially parallel to one another. A portion of a first lateral surface 34 of the first retaining element 26 rests against the side wall 32 of the first aircraft interior component 12 configured in the form of an overhead luggage compartment. In a similar fashion a portion of a first lateral surface 36 of the second retaining element 28 facing the first lateral surface 34 of the first retaining element 26 rests against the side wall, lying opposite the side wall 32, of the first aircraft interior component 12 configured in the form of an overhead luggage compartment.

Figure 7:
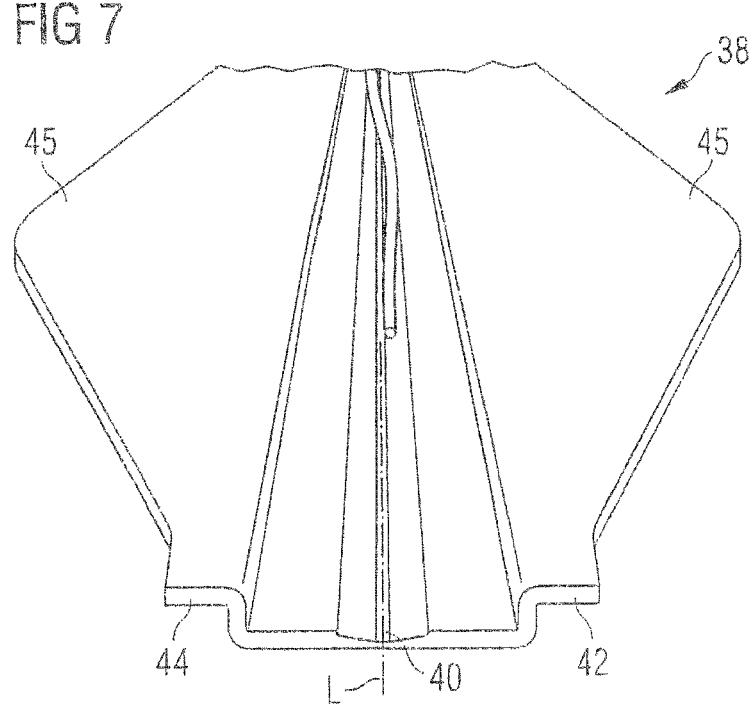
FIG. 7 shows a hinge of the assembly system according to FIGS. 3 and 4.

The second aircraft interior component 14 configured in the form of a cove light panel is connected by a hinge 38, which is represented in FIG. 7, to the third aircraft interior component 16, which comprises a window panel 18 and a dada panel 20. The hinge 38 is constructed in the form of a film hinge and comprises a hinge film 40 that extends along a longitudinal axis L of the hinge 38. The hinge film 40 made from a polyurethane plastic comprises fixing lugs 42, 44 that extend along the longitudinal axis L of the hinge 38. The hinge film 40 is connected by a first fixing lug 42 to a rear side of the second aircraft interior component 14 configured in the form of a cove light panel, wherein the rear side of the second aircraft interior component 14 is not visible in the state of assembly of the aircraft interior component module 10 in an aircraft. In a similar fashion a second fixing lug 44 of the hinge film 40 is connected to a rear side of the third aircraft interior component 16 that is likewise not visible in the state of assembly of the aircraft interior component module 10 in an aircraft. The fixing lugs 42, 44 may be glued to the aircraft interior components 14, 16 or connected in some other way to the aircraft interior components 14, 16. To each of the fixing lugs 42, 44 a stiffening element 45 is fastened. The stiffening elements 45 are made from a fibre-reinforced plastic and are used to lend the hinge 38 the required rigidity.

The hinge film 40 of the hinge 38 extends over the entire longitudinal axis L of the hinge 38 and/or over the entire length of an assembly gap between the second and the third aircraft interior component 14, 16. The hinge film is therefore not only capable of enabling a relative movement between the second and the third aircraft interior component 14, 16 but also covers the assembly gap between the second and the third aircraft interior component 14, 16, i.e. prevents the penetration of dirt or is moisture into the assembly gap.

Figure 8:
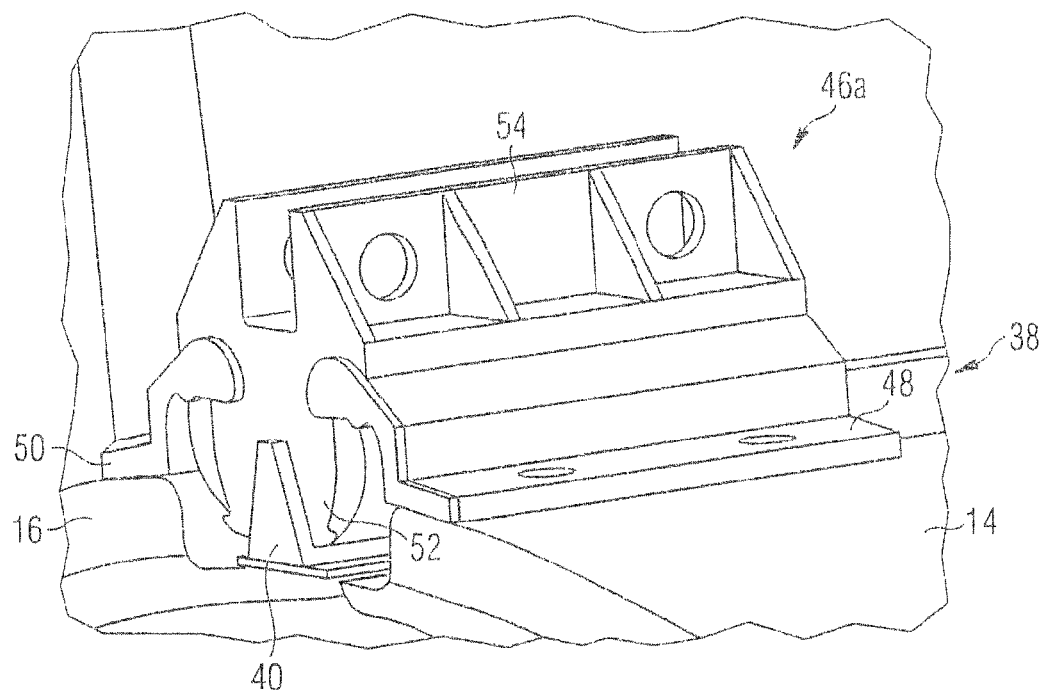
FIG. 8 shows a first embodiment of a hinge element that is suitable for use in a hinge according to FIG. 7.
Figure 9:
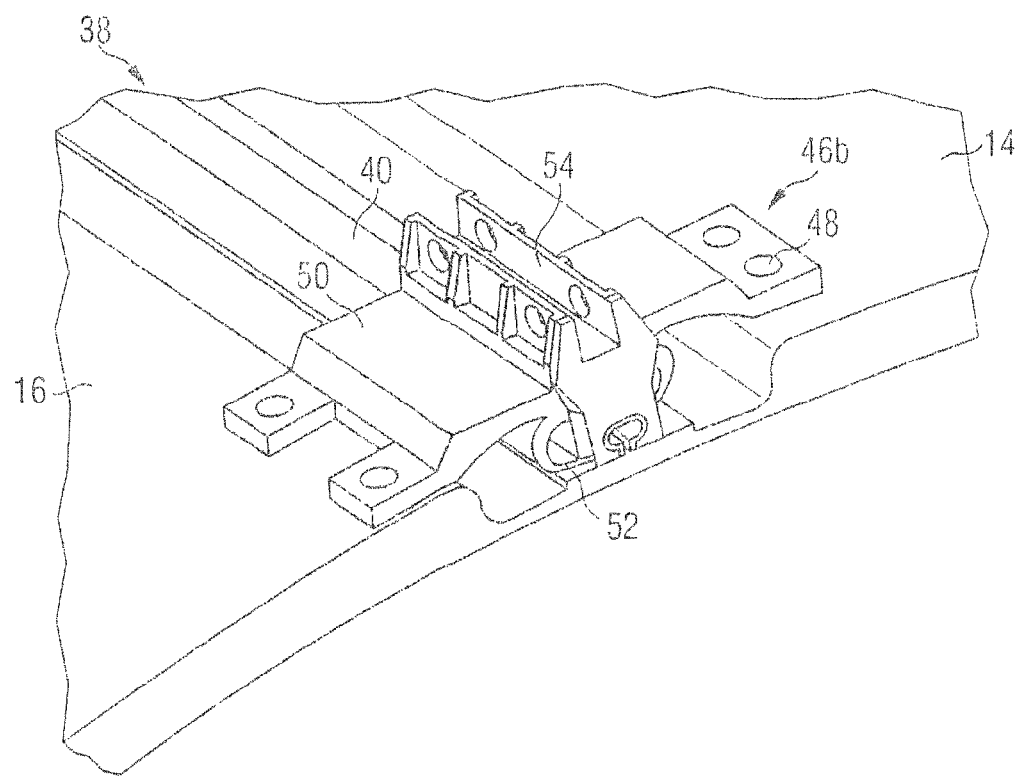
FIG. 9 shows a second embodiment of a hinge element that is suitable for use in a hinge according to FIG. 7.

The hinge 38 farther comprises two hinge elements 46a, 46b, which are connected at mutually opposite ends of the hinge film 40 to the hinge film 40. Two different embodiments of the hinge elements 46a, 46b are shown in FIGS. 8 and 9. The hinge elements 46a, 46h comprise a first fastening portion 48 connected to the second aircraft interior component 14 as well as a second fastening portion 50 connected to the third aircraft interior component 16. A retaining portion 52 of the hinge elements 46a, 46b is connected to the hinge film 40. The embodiments the hinge elements 46a, 46b that are shown in FIGS. 8 and 9 differ substantially in the design of the shape of the retaining portion 52 for receiving the hinge film 40. Finally the hinge elements 46a, 46h are provided with a connection portion 54. The connection portion 54 of the hinge elements 46a, 46b is provided for being connected to a second connection device 56 of the retaining elements 26, 28 that is described in detail below.

The hinge 38 provides for a pivotable connection of the third aircraft interior component 16 to the second aircraft interior component 14. The third aircraft interior component 16 may consequently, as shown in FIG. 5, be pivoted in such a way relative to the second aircraft interior component 14 that the total volume of the aircraft interior component module 10 is markedly reduced. The module 10 in the configuration represented in FIG. 5 may therefore be stored temporarily or transported in a comparatively space-saving manner. Furthermore, the hinge 38 by means of the hinge elements 46a, 46b is used, as mentioned below, for the attachment to the retaining elements 26, 28 of the interior component carrier system 22.

The second connection device 56 provided for connection to the hinge elements 46a, 46b of the hinge 38 is of a substantially L-shaped design and comprises a first limb 58 that is fastened to the respective first lateral surfaces 34, 36 of the retaining elements 26, 28. A second limb 60 extends at an angle of ca. 90° from the first limb 58. The second limb 60 is provided for being received in the connection portion 54 of the hinge elements 46a, 46b and being connected by suitable fixing means, for example screws or rivets, to the connection portion 54 of the hinge elements 46a, 46b. The hinge 38 therefore not only performs the function of connecting the third aircraft interior component 16 pivotably to the second aircraft interior component 14 but also enables the attachment of the second and the third aircraft interior component 14, 16 to the retaining elements 26, 28 of the interior component carrier system 22 and hence to the first aircraft interior component 12.

The second connection device 56 of the first retaining element 24 extends from the first lateral surface 34 of the first retaining element 26 in the direction of the first lateral surface 36 of the second retaining element 28. In a similar fashion the second connection device 56 of the second retaining element 28 extends from the first lateral surface 36 of the second retaining element 28 in the direction of the first lateral surface 34 of the first retaining element 26. This configuration enables a secure connection of the connection devices 56 of the retaining elements 26, 28 to the hinge elements 46a, 46h of the hinge 38 that are disposed in the region of the ends of the hinge film 40.

As may best be seen in FIGS. 3 and 6, a third connection device 62 is further mounted on the first lateral surface 34 of the first retaining element 26. In a similar fashion a third connection device 62 extends also from the first lateral surface 36 of the second retaining element 28. The third connection device 62 comprises a fastening plate 64, which is mounted on the respective lateral surfaces 34, 36 of the retaining elements 26, 28. Extending from the fastening plate 64 is a substantially U-shaped assembly portion 66. The assembly portion 66 engages around an outer surface of a fourth aircraft interior component 68 configured in the form of a lighting element.

Finally a fourth connection device 70 extends in each case from the first lateral surfaces 34, 36 of the retaining elements 26, 28. The fourth connection device 70 comprises a fastening plate 72, which is fastened to the respective lateral surfaces 34, 36 of the retaining elements 26, 28 and from which a web 74 extends. Mounted on the web 74 is an assembly portion 26. The assembly portion 76 is provided with holes that are penetrated by suitable fixing means, such as for example screws or rivets, for connecting the assembly portion 76 to a fifth aircraft interior component 78 configured in the form of an air outlet element of an aircraft air conditioning system.

Finally a structural retainer 80 is mounted on the first lateral surface 34, 36 of each retaining element 26, 28 of the retaining system 24. The structural retainer 80 is used to connect the aircraft interior component module 10 to an aircraft structure during assembly in a fuselage element. The aircraft interior component module 10 may moreover be fixed by means of the structural retainer 80 to a suitable transport device during transport into its final assembly position. This prevents contact between surfaces of the module 10, which are visible in the state of installation of the module 10 in an aircraft, and the transport device and minimizes the risk of fouling or damage of these visible surfaces. The retaining system 24 of the interior component carrier system 22 is therefore used not only to connect the aircraft interior components 12, 14, 16, 68, 78 to one another but also to enable the attachment of these components 12, 14, 16, 68, 78 to the aircraft structure.

In the region of the dado panel 20 forming part of the third aircraft interior component 16 a further structural retainer 82 is mounted. The further structural retainer 82 is used however to fix the third aircraft interior component 16 to the structure in the region of the dado panel 20.

The aircraft interior component module 10 may be pre-assembled outside of the aircraft into a large assembly group that is represented in FIGS. 1 and 2. The module 10 may then be transported into its final assembly position in a fuselage element and fastened there to the aircraft structure by means of the structural retainers 80, 82.

The invention claimed is:

1. An interior component carrier system for use in the assembly of aircraft interior components in an aircraft, comprising:
    (a) a retaining system, which comprises:
        (i) a first retaining element having a first connection device, which is for connecting the first retaining element to a first aircraft interior component, and a second connection device, and
        (ii) a structural retainer, mounted on the retaining element, for fastening the first retaining element to an aircraft structure, and
    (b) a hinge, which is connectable to a second interior component and a third aircraft interior component such that the third aircraft interior component is pivotable about a longitudinal axis of the hinge relative to the second aircraft interior component, wherein the second connection device is configured to be connected to the hinge and at least one of a region of the second interior component that is adjacent to the hinge and a region of the third aircraft interior component that is adjacent to the hinge,
    wherein the hinge comprises:
        a hinge element, the hinge element comprising:
            a first fastening portion connectable to the second aircraft interior component,
            a second fastening portion connectable to the third aircraft interior component, and
            a connection portion disposed between the first fastening portion and the second fastening portion, which is connectable to the second connection device of the retaining element.

2. The interior component carrier system according to claim 1, wherein the retaining element comprises:
    a third connection device for connecting the first retaining element to a fourth aircraft interior component.

3. The interior component carrier system according to claim 2, wherein:
    the second connection device is a connection device for connecting the first retaining element to the hinge that connects a cove light panel to a window panel.

4. The interior component carrier system according to claim 2, wherein the retaining element comprises:
    a fourth connection device for connecting the first retaining element to an air outlet element of an aircraft air conditioning system.

5. The interior component carrier system according to claim 2, wherein the first connection device is a connection device for connecting the first retaining element to an overhead luggage compartment.

6. The interior component carrier system according to claim 2, wherein the third connection device is a connection device for connecting the first retaining element to a lighting element.

7. The interior component carrier system according to claim 1, wherein the retaining system further comprises:
    a second retaining element which extends substantially parallel to the first retaining element, and
    wherein at least one of the first connection device and the second connection device is mounted on a first lateral surface of the first retaining element that faces a first lateral surface of the second retaining element, on which lateral face a corresponding connection device corresponding to the first and second connection devices, is mounted on the second retaining element.

8. The interior component carrier system according to claim 1, wherein the hinge is configured in the form of a film hinge, which comprises a hinge film extending along the longitudinal axis of the hinge.

9. The interior component carrier system according to claim 8, wherein the hinge comprises a retaining portion connectable to the hinge film.

10. The interior component carrier system according to claim 8, wherein the hinge comprises at least one stiffening element, which is connected to the hinge film, extends along at least a portion of the longitudinal axis of the hinge and is connectable to the second or the third aircraft interior component.

11. An aircraft interior component module comprising:
    an interior component carrier system according to claim 1,
    a first aircraft interior component, which is connected by the first connection device to the first retaining element of the retaining system of the interior component carrier system, and
    a second aircraft interior component, which is connected by the hinge of the interior component carrier system to a third aircraft interior component such that the third aircraft interior component is pivotable about the longitudinal axis of the hinge relative to the second aircraft interior component,
    wherein the second connection device provided on the first retaining element of the retaining system of the interior component earner system is connected to at least one of the hinge and a region of at least one of the second and the third aircraft interior component that is adjacent to the hinge in order to fasten the second and the third aircraft interior component to the first retaining element, and
    wherein the aircraft interior component module is fastenable to an aircraft structure by means of the structural retainer provided on the first retaining element of the retaining system of the interior component carrier system.

12. The aircraft interior component module according to claim 11, further comprising:
a fourth aircraft interior component, which is connected by a third connection device to the retaining element of the retaining system of the interior component carrier system.

13. The aircraft interior component module according to claim 12, further comprising:
a fifth aircraft interior component, which is connected by a fourth connection device to the retaining element of the retaining system of the interior component carrier system.

14. The aircraft interior component module according to claim 13,
wherein the retaining system further comprises a second retaining element, and
wherein at least one of the second, the third, the fourth and the fifth aircraft interior components is connected to the first retaining element by a connection device of the first retaining element that is mounted on a first lateral surface of the first retaining element, and wherein at least one of the second, the third, the fourth and the fifth aircraft interior components is connected to the second retaining element by a connection device of the second retaining element that is mounted on a first lateral surface of the second retaining element, wherein the first lateral surface of the first retaining element faces the first lateral surface of the second retaining element.

15. The aircraft interior component module according to claim 11,
wherein the first retaining element of the retaining system is fastened by the first connection device of the first retaining element to a first side wall of the first aircraft interior component and a second retaining element of the retaining system is fastened to a second side wall of the first aircraft interior component that lies opposite and parallel to the first side wall, and
wherein the first and the second retaining elements of the retaining system extend substantially parallel to one another.

16. The aircraft interior component module according to claim 11,
wherein the first aircraft interior component is an overhead luggage compartment, the second aircraft interior component is a cove light panel, the third aircraft interior component comprising a window panel and a dado panel, and wherein the aircraft interior component module further comprises a fourth aircraft interior component which is a lighting element and a fifth aircraft interior component which is an air outlet element of an aircraft air conditioning system.

17. The aircraft interior component module according to claim 11, wherein the hinge of the interior component carrier system extends along an assembly gap between the second and the third aircraft interior component and substantially completely covers the assembly gap, and wherein and at least one of:
at least one hinge element of the hinge is connected by the first fastening portion of the hinge element to the second aircraft interior component and by the second fastening portion of the hinge element to the third aircraft interior component; and
at least one stiffening element of the hinge is connected along at least a portion of the longitudinal axis of the hinge to the second or the third aircraft interior component.

18. The aircraft interior component module according to claim 11, wherein a further structural retainer is provided on the third aircraft interior component for connecting the third aircraft interior component to the aircraft structure.

19. A method of assembling an aircraft interior component module in an aircraft, comprising the steps:
preassembling an aircraft interior component module according to claim 11 outside of the aircraft,
transporting, the aircraft interior component module into a final assembly position in a fuselage element, and
fastening the aircraft interior component module to an aircraft structure by means of the structural retainer of the interior component carrier system.

20. Aircraft interior component module comprising:
an interior component carrier system comprising:
(a) a retaining system, which comprises:
(i) a retaining element having a first connection device, which is for connecting the retaining element to a first aircraft interior component, and a second connection device, and
(ii) a structural retainer, mounted on the retaining element, for fastening the retaining element to an aircraft structure, and
(b) a hinge, which is connectable to a second aircraft interior component and a third aircraft interior component such that the third aircraft interior component is pivotable about a longitudinal axis of the hinge relative to the second aircraft interior component, wherein the second connection device is configured to be connected to the hinge and at least one of a region of the second aircraft interior component that is adjacent to the hinge and a region of the third aircraft interior component that is adjacent to the hinge,
wherein the first aircraft interior component is connected by means of the first connection device to the retaining element of the retaining system of the interior component carrier system,
wherein the second aircraft interior component is connected by the hinge of the interior component carrier system to a third aircraft interior component such that the third aircraft interior component is pivotable about the longitudinal axis of the hinge relative to the second aircraft interior component,
wherein the second connection device provided on the retaining element of the retaining system of the interior component carrier system is connected to at least one of the hinge and a region of at least one of the second and the third aircraft interior components that is adjacent to the hinge in order to fasten the second and the third aircraft interior components to the retaining element,
wherein the aircraft interior component module is fastenable to an aircraft structure by means of the structural retainer provided on the retaining element of the retaining system of the interior component carrier system, and
wherein a further structural retainer is provided on the third aircraft interior component connecting the third aircraft interior component to the aircraft structure.

* * * * *